Feb. 1, 1949.    W. S. RENIER    2,460,468
MOLDING MACHINE FOR PLASTICS AND
OTHER MOLDABLE MATERIALS
Filed May 6, 1947    3 Sheets-Sheet 1
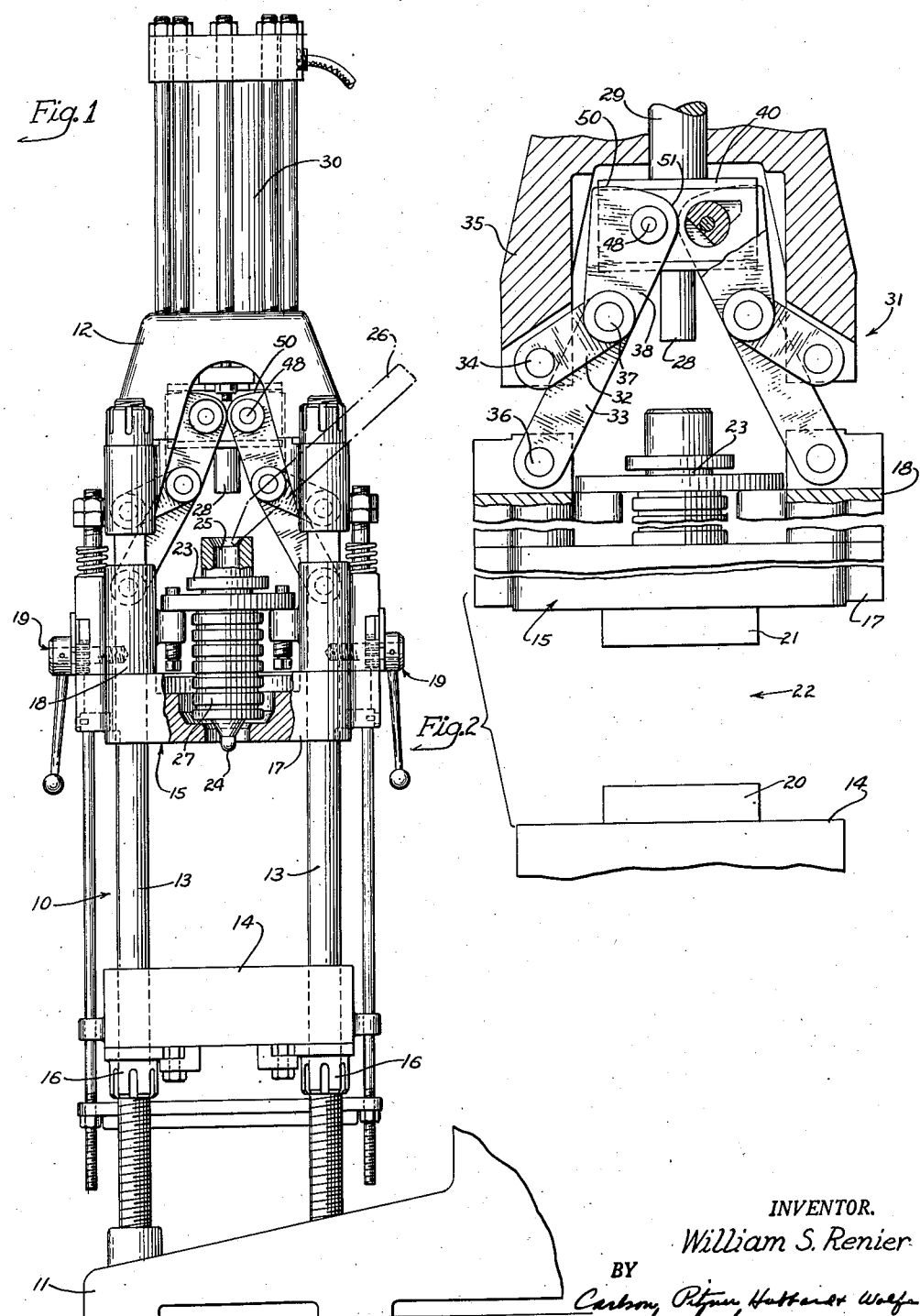
INVENTOR.
William S. Renier
BY
Carlson, Pitzner, Hubbard & Wolfe
Attys.

Feb. 1, 1949.  W. S. RENIER  2,460,468
MOLDING MACHINE FOR PLASTICS AND
OTHER MOLDABLE MATERIALS
Filed May 6, 1947  3 Sheets-Sheet 2

INVENTOR.
William S. Renier
BY
Carlson, Pitzner, Hubbard & Wolfe
Attys.

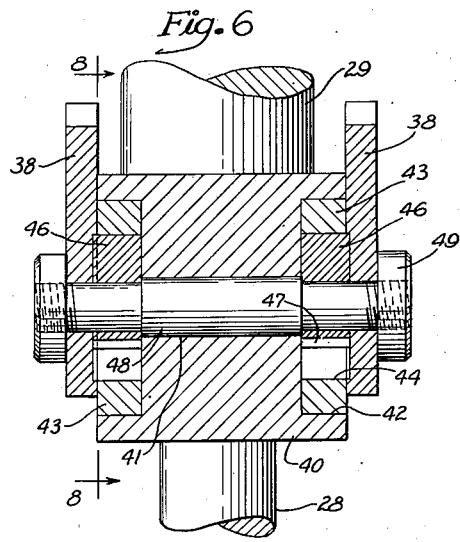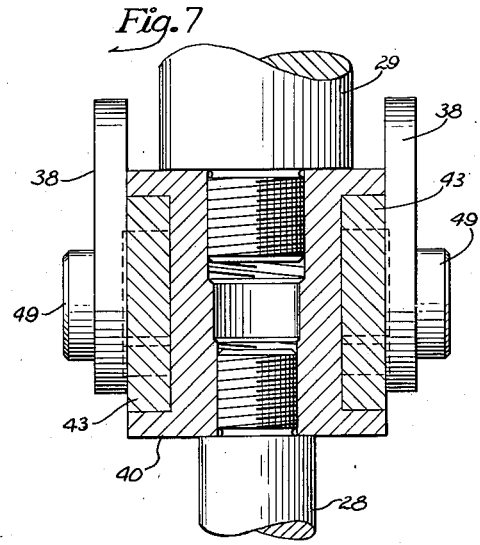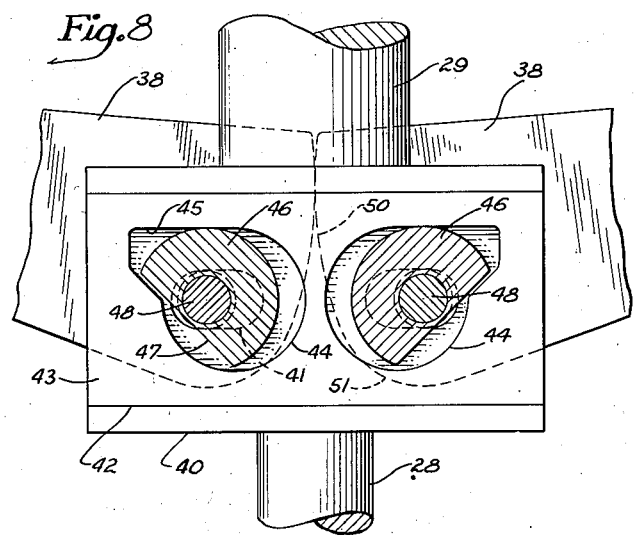

Patented Feb. 1, 1949

2,460,468

UNITED STATES PATENT OFFICE 2,460,468

MOLDING MACHINE FOR PLASTICS AND OTHER MOLDABLE MATERIALS

William S. Renier, Fond du Lac, Wis., assignor to Giddings & Lewis Machine Tool Company, Fond du Lac, Wis., a corporation of Wisconsin Application May 6, 1947, Serial No. 746,242

7 Claims. (Cl. 18—30)

The present invention relates to machines for molding or die casting plastics and other moldable materials, and has particular reference to improvements in machines of the type disclosed in my Patent No. 2,416,349, issued February 25, 1947, in which a power actuator is operable through dual toggle mechanisms for causing opening and closing movements of a movable die plate relative to a second die plate supported on the machine frame, and is simultaneously operable to reciprocate an injection plunger in timed relation to said movements.

One of the objects of the present invention is to provide a new and improved toggle mechanism of the foregoing character which is simple and efficient in construction and operation.

Another object is to provide dual toggle mechanisms having toggle joints operable by interacting cam links, pivotally connected to the actuator, the pivotal connections being fixed relatively to each other during the die closing and opening movements, and being shiftable relatively to each other in a lost motion movement during travel of the injection plunger in completing each pressure stroke and initiating each return stroke.

Further objects and advantages will become apparent as the description proceeds.

In the accompanying drawings,

Figure 1 is a fragmentary front elevational view of a machine embodying the features of the present invention, and illustrating the position of the parts when the die or mold is fully open.

Fig. 2 is a fragmentary vertical sectional view, on a larger scale, of the parts as shown in Fig. 1, and illustrating the toggle mechanisms at the start of the forward pressure stroke.

Figure 3:
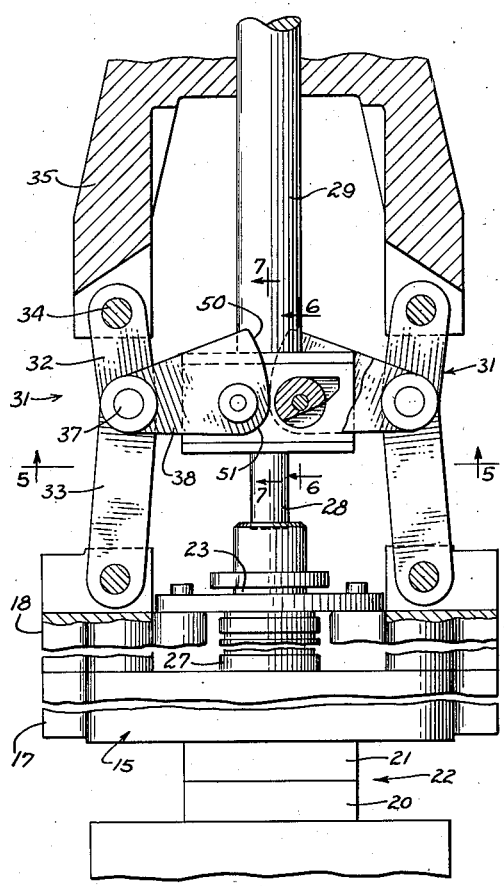
Fig. 3 is a view similar to Fig. 2, but showing the position of the parts when the die has just been closed.
Figure 4:
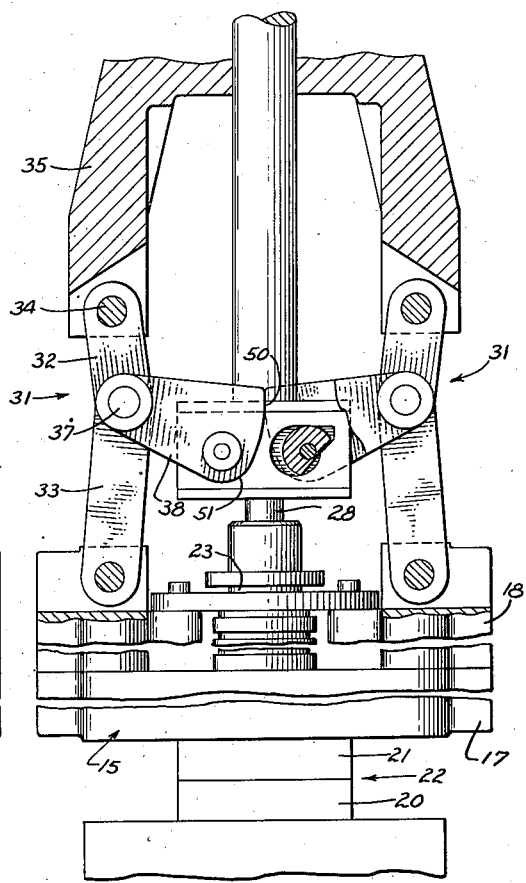
Fig. 4 is a view similar to Fig. 2, but showing the position of the parts at the end of the pressure injection stroke.

Figs. 6 and 7 are transverse vertical sectional views taken respectively along lines 6—6 and 7—7 of Fig. 3.

Figure 5:
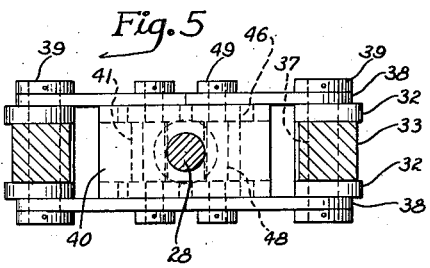
Fig. 5 is a horizontal sectional view taken along line 5—5 of Fig. 3.

Fig. 8 is a fragmentary sectional view taken along line 8—8 of Fig. 5.

Referring more particularly to the drawings, the machine, constituting the exemplary embodiment of the invention, comprises an upright frame 10 constructed of a suitable base 11, a vertically spaced head 12, and a plurality of vertical tie rods 13 rigidly interconnecting the base and the head, and constituting guide members for stationary and movable die plates 14 and 15. In the present instance, four quadrilaterally spaced tie rods 13 are provided.

The stationary die plate 14 is adjustably supported by and clamped to a plurality of locating nuts 16 threaded on the lower portions of the tie rods 13. The movable die plate 15 is sectional, comprising a lower half 17 and an upper half 18 normally clamped together by releasable locking means 19, and is vertically slidable on the rods 13.

Secured in any suitable manner in opposed relation respectively to the adjacent surfaces of the die plates 14 and 15 are two separable sections 20 and 21 of a suitable mold 22. A vertically disposed heating cylinder 23 is supported on the upper half 18 of the movable die plate 15, and has an injector nozzle 24 at the lower end normally opening to the upper section 21 of the mold 22 when the halves 17 and 18 of the plate 15 are clamped together. It will be understood that the locking means 19 may be released, whenever the occasion arises, to part the halves 17 and 18 so as to retract the nozzle 24 from the mold section 21.

The heating cylinder 23 has an axial feed chamber 25 open at the upper end into which plastic material in any suitable form may be directed by a supply chute 26, and is provided with heating means 27 for generating the heat necessary to plasticize the material in its downward course of movement toward the nozzle 24.

To provide means for forcing charges of plasticized material under heavy molding pressure from the heating cylinder 23 through the nozzle 24 into the mold 22, an injection plunger 28 is supported from the head 12 in alinement with and for movement repeatedly into the feed opening 25 in a succession of pressure strokes for recurring machine cycles. Within the scope of the present invention, any suitable power means may be utilized for reciprocating the plunger 28. In the present instance, the injection plunger 28 is rigidly secured coaxially to the lower end of a piston rod 29 forming part of a reciprocatory hydraulic actuator 30 mounted vertically on the top of the head 12.

The hydraulic actuator 30 is connected through two parallel acting toggle mechanisms 31 for reciprocating the movable die plate 15 toward and from the stationary plate 14 to close and open the die or mold 22 in predetermined timed relation to the reciprocation of the injection plunger 28 continued travel being imparted to the plunger to complete each forward pressure stroke into the heating cylinder 23 after the die 22 has been closed and clamped, and to move through a comparable distance on each return stroke before the die is opened.

Each of the toggle mechanisms 31, which are substantially alike in construction, comprises two spaced parallel upper links 32 pivotally connected at their fixed end by a pin 34 to a depending arm 35 on the head 12, and a lower link 33 therebetween pivotally connected at its fixed end by a pin 36 to the upper half 18 of the die plate 15. The contiguous movable ends of the links 32 and 33 overlap and are pivotally connected by a pin 37 to constitute a toggle joint. Also pivotally connected to the pin or toggle joint 37 is a force applying element, which in the present instance comprises two spaced parallel cam links 38. The ends of the links 32, 33 and 38, which are pivotally connected at the toggle joint, are confined in assembled or sandwiched relation by means of nuts 39 on opposite ends of the pin 37.

The dual toggle mechanisms 31 are located in balanced relation respectively at opposite sides of the machine, and with the cam links 38 extending toward each other for operative connection to the actuator 30, and for coaction to exert in opposite directions of movement a straightening or buckling force at the joints 37. In the preferred construction, a cross head or toggle head 40 is threaded medially onto the lower end of the piston rod 29, and the injection plunger 28 is threaded into the head. The cross head 40 is formed in opposite end portions with two elongated horizontal slots 41, and in opposite sides with two longitudinal guideways 42 in which two flat bearing slides 43 are slidably disposed. Each of the slides 43 is formed in opposite end portions with bearing openings 44 which are circular in form except for an eccentric recess 45 in the outer side portion. The cam links 38 of each set extend in overlapping relation with opposite sides of the cross head 40, and are pivotally connected respectively to the adjacent ends of the bearing slides 43. Each cam link 38 has rigidly attached to one side thereof at its inner end a partially circular journal or bearing 46 which is adapted for rotation in the associated opening 44, and which is cut away at one side along a chord, as indicated at 47, so as to permit outward movement when in a predetermined angular position into the recess 45. The cam links 38 of each set are connected concentrically of the bearings 46 to opposite ends of a pin 48 extending through the associated slot 41 in the cross or link head 40. Suitable nuts 49 on opposite ends of the pin 48 serve to maintain the parts in assembled relation.

The opposed sets of cam links 38 are formed with cooperating cam-shaped ends 50 the upper portions of which are arcuate about the axes of the outermost pivot pins 37, and the lower portions of which have curvatures 51 arcuate about the innermost pins 48. In the downward movement of the cross head 40, the links 38 act through the toggle mechanisms 31 initially to impart a closing movement and then a heavy clamping pressure to the die or mold 22, and thereafter to maintain the final pressure while the injection plunger 28 is finishing its injection stroke.

In operation, the parts will be positioned as shown in Figs. 1 and 2 when the die is open. As the piston rod descends, the toggle mechanisms 31 serve to advance the movable die plate 15 toward and into closed position, as shown in Fig. 3. During this movement, the injection plunger 28 is also advanced but at a progressively increasing differential rate. Up until the parts have reached the position illustrated in Fig. 3, in which the links 38 are substantially horizontal and the sections 20 and 21 of the die or mold 22 have been closed and clamped together by the toggle action, the journals 46 on the cam links 38 have been so positioned angularly that they have been rotatably confined for fixed pivotal movement within the bearing openings 44. In other words, although the bearing slides 43 have been free to move transversely on the cross head 40, so as to insure equalization of the forces applied through the opposite sets of cam links 38, the pivotal connections 48 of these links with the plates have been confined in fixed position relatively to each other with minimum center distances therebetween. Continued movement of the piston rod 28 in a downward direction beyond dead center of the links 38 will further turn the journals 46 in the holes 44 so that they will be free to move outwardly partially into the recesses 45 in a combined rolling and sliding action, thereby providing a lateral floating or lost motion connection. During such completion of the forward pressure stroke of the injection plunger 28, the pivoted connections 48 move outwardly or apart and the upper portions of the cam ends 50 roll on each other to maintain the die clamping pressure during the molding operation.

In the return stroke of the injection plunger 28, the movements of the various parts of the toggle mechanisms 31 are reversed. As soon as the cam links are moved into approximate horizontal alinement, as shown in Fig. 3, at which time the die closing pressure is about to be relieved and the die is about to be opened, the journals 46 on the inner ends of the links are moved out of the recesses 45, and again confined in rotary bearing engagement within the bearing openings 44, thereby maintaining the parts in established pivotal relation to prevent sudden movement and shock as the toggle joints 37 are broken to separate the die sections 20 and 21.

While I have illustrated the invention as incorporated in a vertical machine having a hydraulic actuator for operating the movable die plate 15 and the injection plunger 28, it is to be understood that the invention may be applied equally well to machines of other types and employing other kinds of power actuators.

I claim as my invention:

1. In a machine for molding plastics or other moldable material, a supporting frame, a first plate carried by said frame for supporting part of a die, a second plate movably carried by said frame for supporting the other part of the die, toggle joint mechanism connecting said movable die plate to said frame, a cylinder carried by said frame and having a fluid pressure operated piston therein and having a piston rod projecting therefrom, a heating cylinder carried by said movable die plate having a chamber for receiving plastic material and having a nozzle portion for directing plastic material in plasticized condition into said die, an injection plunger connected to said piston rod and movable into and out of said heating cylinder, and connecting means between said piston rod and toggle joint mechanism for causing opening and closing movements of said movable die plate in response to movement of said piston rod, said connecting means including means for maintaining a die closing pressure while said injection plunger finishes its forward stroke, and having an operative connection with said piston rod which is pivotally fixed during said opening and closing movements of said movable die plate and which is released for lateral lost motion movement while said last mentioned means is operative.

2. In a machine for molding plastics or other moldable material, a supporting frame, a first plate carried by said frame for supporting one part of a die, a second plate movably carried by said frame for supporting the other part of said die, toggle joint mechanism connecting said movable die plate to the frame, means operable on said toggle joint mechanism for causing opening and closing movements of the movable die plate, said last means including cam mechanism for maintaining a die closing pressure, and including a connection with said toggle joint mechanism which is pivotally fixed during said opening and closing movements of said movable die plate and which is released for lateral floating lost motion when said cam mechanism is operative, a heating cylinder carried by said movable die plate and having a chamber for receiving plastic material and having a nozzle portion for directing plastic material in plasticized condition into said die, and an injection plunger operable by said toggle joint operating means and movable into said heating cylinder while said cam mechanism is maintaining die closing pressure.

3. In a machine for molding plastics or other moldable material, a supporting frame, a first plate carried by said frame for supporting one part of a die, a second plate movably carried by said frame for supporting the other part of the die, spaced toggle joints each having one end pivotally connected to the frame and its other end pivotally connected to said movable die plate, a movable toggle head, a heating cylinder carried by said movable die plate and having a chamber for receiving plastic material and a nozzle portion for directing plastic material in plasticized condition into said die, an injection plunger movable with said toggle head, two connecting links at opposite sides of said head and having pivotal connections at their adjacent ends to opposite sides of said head and being pivoted at their remote ends respectively to the knees of said toggle joints, means for forcibly moving said toggle head to cause movement of said movable die plate toward and away from said first mentioned die plate, and means including cooperable cam shaped ends on said connecting links for maintaining a die closing pressure while said injection plunger finishes its forward stroke, said pivotal connections being relatively fixed during said opening and closing movements of said die plate and being released for lateral lost motion movement while said cam shaped ends are operatively maintaining said closing pressure.

4. In a machine for molding plastics or other moldable material, a supporting frame, a first plate carried by said frame for supporting one part of a die, a second plate movably carried by said frame for supporting the other part of the die, spaced toggle joints one end pivotally connected to the frame and each having its other end pivotally connected to said movable die plate, a movable toggle head having an equalizing plate laterally slidable thereon, a heating cylinder carried by said movable die plate and having a chamber for receiving plastic material and a nozzle portion for directing plastic material in plasticized condition into said die, an injection plunger movable with said toggle head, two connecting links at opposite sides of said head and having pivotal connections at their adjacent ends to opposite ends of said slide and being pivoted at their remote ends respectively to the knees of said toggle joints, means for forcibly moving said toggle head and plate to cause movement of said movable die plate toward and away from said first mentioned die plate, and means including cooperable cam shaped ends on said connecting links for maintaining a die closing pressure while said injection plunger finishes its forward stroke, said pivotal connections being relatively fixed during said opening and closing movements of said die plate and being released for lateral separating movement while said cam shaped ends are operatively maintaining said closing pressure.

5. In a machine for molding plastics or other moldable material, a supporting frame, a first plate carried by said frame for supporting one part of a die, a second plate movably carried by said frame for supporting the other part of the die, spaced toggle joints one end pivotally connected to the frame and each having its other end pivotally connected to said movable die plate, a movable toggle head having an equalizing slide laterally slidable thereon, a heating cylinder carried by said movable die plate and having a chamber for receiving plastic material and a nozzle portion for directing plastic material in plasticized condition into said die, an injection plunger movable with said toggle head, two connecting links at opposite sides of said head and having pivotal connections at their adjacent ends to opposite ends of said slide and being pivoted at their remote ends respectively to the knees of said toggle joints, means for forcibly moving said toggle head and plate to cause movement of said movable die plate toward and away from said first mentioned die plate, and means including cooperable cam shaped ends on said connecting links for maintaining a die closing pressure while said injection plunger finishes its forward stroke.

6. In a machine for molding plastics and other moldable materials, in combination, a supporting frame, a first plate on said frame for supporting one part of a die, a second plate movably carried by said frame for supporting the other part of said die, a heating cylinder carried by said movable die plate and having a chamber for receiving plastic material and a nozzle portion for directing plastic materials in plasticized condition into said die when said die is closed, a reciprocatory hydraulic actuator mounted on said frame and having a piston rod axially alined with said heating cylinder, a cross head attached to the free end of said rod, a depending injection plunger attached to said cross head in axial alinement with said piston rod and movable into and out of said cylinder, an equalizer plate slidably confined for transverse movement on said cross head and formed in opposite end portions with a circular bearing opening having an eccentric recess in one side, two pivot pins extending through elongated guide slots in opposite end portions of said cross head, two circular journals mounted on said pins and in said bearing openings, each of said journals being cut away at one side along a chord so as to facilitate movement out of bearing engagement with the associated opening into said recess, spaced toggle joints each having one end pivotally connected to said frame and the other end pivotally connected to said movable die member, connecting links attached at their adjacent ends rigidly to said bearings and at their outer ends respectively to said joints, and means including cooperable cam shaped ends on said connecting links for maintaining a die closing pressure while said injection plunger finishes its forward stroke.

7. In a machine for molding plastics and other moldable materials, in combination, a supporting frame, a first plate on said frame, a second plate movably carried by said frame, a reciprocatory actuator mounted on said frame and having an actuating rod, a cross head attached to the free end of said rod, a circular bearing opening having an eccentric recess in one side, a pin extending through an elongated guide slot in said cross head for lateral movement, a circular journal mounted on said pin and in said bearing opening and being cut away at one side along a chord so as to facilitate movement thereof out of concentric bearing engagement with said opening into said recess over a predetermined range of angular movement, a toggle joint having one end pivotally connected to said frame and the other end pivotally connected to said movable plate, a connecting link attached at its adjacent end rigidly to said journal and at its outer end to said joint, and means including cooperable cam members for acting on said link to maintain said joint in fixed position over said range of angular movement.

WILLIAM S. RENIER.

REFERENCES CITED

The following references are of record in the file of this patent:

UNITED STATES PATENTS

| Number | Name | Date |
|---|---|---|
| 945,550 | Klocke | Jan. 4, 1910 |
| 2,416,349 | Renier | Feb. 25, 1947 |